Feb. 7, 1961 W. RUF 2,970,867

TRACK WHEEL FOR TRACK-LAYING VEHICLES

Filed Sept. 29, 1958

United States Patent Office 2,970,867
Patented Feb. 7, 1961

2,970,867

TRACK WHEEL FOR TRACK-LAYING VEHICLES

Walter Ruf, Landhaus am See, Bottighofen,
Canton Thurgau, Switzerland

Filed Sept. 29, 1958, Ser. No. 764,038

Claims priority, application Switzerland Dec. 24, 1957

6 Claims. (Cl. 305—56)

This invention relates to track or running wheels for track-laying vehicles of the type having a rubber tire and two retaining rings partially overlapping the same at the sides.

In known track wheels of the foregoing type, the rubber tire is vulcanised on to the wheel rim or otherwise fixedly connected thereto and the retaining rings, which partially overlap the rubber tire at the sides, are secured to the wheel rim by screws. These retaining rings are subjected to extremely heavy wear because at times they have to transmit very considerable lateral forces to the links of the Caterpillar tracks, with resulting heavy friction against the guide spurs of the links of the Caterpillar tracks. Quite apart from this disadvantage, the changing of worn-out vulcanised-on rubber tires occupies considerable time as the connecting surface between the rubber and the rim normally has to be stripped by means of a cutting tool.

The present invention has for its object to reduce the wear on the retaining rings and the expenditure of time required for changing the rubber tires and to this end the rubber tire is arranged to rest on the wheel rim so that it is displaceable laterally and the two retaining rings are connected to one another by means of bolts and clamp the rubber tire between them, have a clearance with respect to the rim for the purpose of permitting lateral displacement and are held in position by means of rubber distance pieces which are arranged between the retaining rings and the wheel body. Owing to the retaining rings being displaceable laterally and being sprung with respect to the wheel body by means of the rubber distance pieces, the wear on these retaining rings is appreciably reduced. Moreover the changing of worn-out rubber tires is effected merely by pulling off the old rubber tire and pushing the new rubber tire on to the rim.

It will be understood that, as used herein, the term "rubber" is intended to include also rubber-like materials suitable for the purposes of the invention.

One embodiment of the invention will now be more particularly described, by way of example, with reference to the accompanying drawings, in which.

Figure 1:
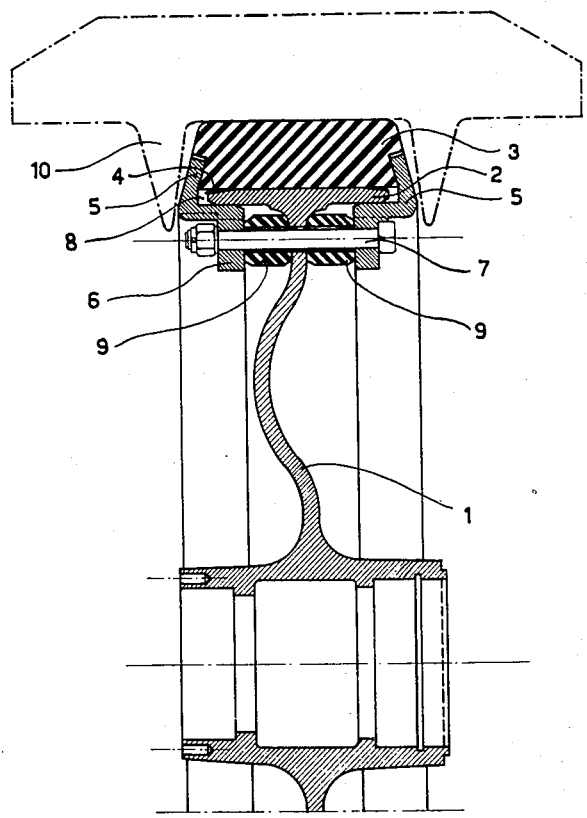
Figure 1 is a cross-section through a part of a track wheel.
Figure 2:
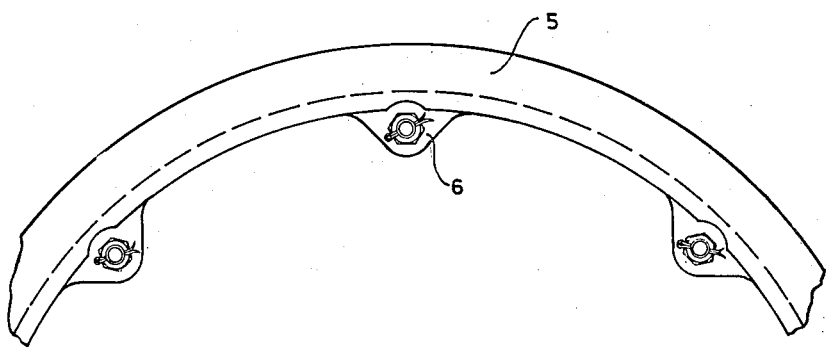
Figure 2 is a side view of a part of a retaining ring of the wheel.

The wheel disc 1 is provided with a rim 2 whose peripheral surface, on to which the rubber tire 3 is pushed, is formed as a cylinder the ends of which are tapered, as indicated at 4 in Figure 1. The retaining rings 5 are of angular cross-section and comprise perforated lugs 6 for receiving connecting bolts 7. As will be seen from Figure 1, the retaining rings 5 partially overlap the rubber tire 3 at the sides and are so connected to one another by means of the connecting bolts 7 that they clamp the rubber tire 3 between them. The retaining rings 5 have a clearance 8 with respect to the rim 2 for the purpose of permitting lateral displacement. Since the rubber tire 3 also rests on the wheel rim 2 so that it is laterally displaceable thereon, the parts 3, 5 and 7 can be displaced laterally as a unit with respect to the other parts of the track wheel. The retaining rings 5 are held in position by means of rubber distance pieces 9 which are arranged between the retaining rings and the wheel disc 1. The distance pieces 9 are of sleeve-like construction and are pushed on to the bolts 7. It can moreover be seen from Figure 1 that the outer surfaces of those parts of the retaining rings 5 which partially overlap the rubber tire 3 are flush with the lateral surfaces of the rubber tire adjacent thereto.

The construction described has the advantage that the retaining rings, which are subject to wear, are sprung in the lateral direction, so that the wear is considerably less than it would be if the retaining rings were screwed fixedly to the wheel rim. The changing of worn-out rubber tires and retaining rings is moreover simplified, since it is merely necessary for the connecting bolts provided with castellated nuts secured by split pins to be disengaged and inserted again.

When the track-laying vehicle makes a significant change of direction, such considerable lateral forces are produced between the guide spurs 10 of the links of the endless tracks and the retaining rings that the track wheel endeavours to jump out of the space between two guide spurs of the endless track links. In known constructions, in which the edge of the retaining ring which partially overlaps the rubber tire 3 merely rests against an unrecessed lateral surface of the rubber tire, the result of the foregoing condition is that the points of the guide spurs become caught on such edge of the retaining ring and thereby cause considerable damage, replacement of the component parts being rendered necessary. Owing to the fact that in the construction illustrated in the drawings the non-overlapped portion of the lateral surface of the rubber tire is flush with the outer lateral surface of the retaining ring, the above-mentioned drawbacks are avoided.

The taper shown at 4 in the cylindrical surface of the wheel rim 2 permits easy changing of the rubber tires 3, also facilitates the lateral displacement of the rubber tire on the rim during operation and moreover serves to accommodate the mass of rubber of the tire 3 which is displaced by the clamping action of the retaining rings 5.

In the manufacture of track-laying vehicles, it frequently happens that a row of track wheels arranged on one side of the vehicle are not in exact alignment. As a result, one-sided wear phenomena then occur in the retaining rings in individual wheels. In the construction illustrated, this drawback can easily be obviated in that the rubber tire 3 of any track wheel which is not in exact alignment can be brought into proper alignment by using distance pieces 9 of different lengths.

What I claim is:

1. A track wheel for track-laying vehicles adapted to receive and propel the track comprising, in combination, a wheel body adapted to receive an axle and having a rim at its radially-outer end provided with a peripheral surface adapted to receive a resilient tire with freedom of limited lateral displacement, a pair of retaining rings disposed each on one side of said rim and partially overlapping the opposite sides of said tire for limiting said lateral displacement, said retaining rings having a clearance with respect to the edges of said rim for limited lateral displacement relative thereto, means interconnecting said retaining rings to hold them against said tire but permitting said limited lateral displacement, and resilient distance pieces disposed between said retaining rings and said body to restrain resiliently said lateral displacement and return said retaining rings and said tire to their initial position upon release of any force causing lateral displacement.

2. The combination of claim 1, wherein said interconnecting means comprise bolts and wherein said distance pieces are of sleeve-like construction and are disposed around said bolts.

3. The combination of claim 1, wherein said interconnecting means comprise bolts and wherein said retaining rings are of angular cross-section and are provided with perforated lugs for receiving said bolts.

4. The combination of claim 1, wherein the outer surfaces of the portions of said retaining rings which partially overlap said rubber tire are flush with the lateral surfaces of said rubber tire adjacent to said outer surfaces of said portions.

5. The combination of claim 1, wherein the outer peripheral surface of said rim is formed as a cylinder the ends of which are tapered.

6. A track wheel for track-laying vehicles adapted to receive and propel the track comprising, in combination, a wheel body adapted to receive an axle and having a generally radially-extending web formed with a plurality of perforations, a rim at the radially-outer end of said web having a peripheral surface adapted to receive a resilient tire with freedom of limited lateral displacement, a pair of retaining rings disposed each on one side of said rim and partially overlapping the opposite sides of said tire for limiting said lateral displacement, said retaining rings having a clearance with respect to the edges of said rim for limited lateral displacement relative thereto, lugs on said retaining rings having perforations therein aligned with said perforations in said wheel body, bolts passing through said aligned perforations in said retaining rings and in said web to interconnect said retaining rings to hold them against said tire but permitting said limited lateral displacement, and sleeve-like resilient distance pieces surrounding said bolts and disposed between said retaining rings and said web to restrain resiliently said lateral displacement and return said retaining rings and said tire to their initial position upon release of any force causing lateral displacement.

References Cited in the file of this patent

UNITED STATES PATENTS

| | | |
|---|---|---|
| 1,352,639 | Thompson | Sept. 14, 1920 |
| 1,431,878 | Dixon | Oct. 10, 1922 |
| 2,329,901 | Herrington | Sept. 21, 1943 |
| 2,768,862 | Christensen | Oct. 30, 1956 |

FOREIGN PATENTS

| | | |
|---|---|---|
| 469,722 | Great Britain | July 30, 1937 |